Jan. 10, 1967 A. R. HAMILTON 3,297,964

ERROR AVOIDANCE SYSTEM FOR SAMPLING TYPE AFC CIRCUIT

Filed Oct. 9, 1963 2 Sheets-Sheet 1

INVENTOR.
ALAN R. HAMILTON
BY Moody and Harris
ATTORNEYS

ERROR AVOIDANCE SYSTEM FOR SAMPLING TYPE AFC CIRCUIT

Filed Oct. 9, 1963 2 Sheets-Sheet 2

INVENTOR.
ALAN R. HAMILTON
BY Moody and Harris
ATTORNEYS

United States Patent Office 3,297,964

Patented Jan. 10, 1967

3,297,964

ERROR AVOIDANCE SYSTEM FOR SAMPLING TYPE AFC CIRCUIT

Alan R. Hamilton, Cedar Rapids, Iowa, assignor to Collins Radio Company, Cedar Rapids, Iowa, a corporation of Iowa

Filed Oct. 9, 1963, Ser. No. 314,987

4 Claims. (Cl. 332—19)

This invention relates to an automatic frequency control system and more particularly to an automatic frequency control system of the sampling type having means whereby continuous tones in received modulating signals that are odd-harmonically related to the sampling frequency are automatically prevented from introducing error into the system.

The use of automatic frequency control (AFC) systems are well known in the electronics art. One of the better systems now known for accomplishing automatic frequency control is known as the sampling type wherein the carrier frequency of a direct frequency modulator is maintained at a predetermined frequency by comparing the frequency modulated output of the modulator with a stable reference frequency.

While such a system has been known and utilized for some time, no solution to the problem of error introduced into the system when received modulation signals included a continuous tone odd-harmonically related with respect to the sampling frequency has been devised until quite recently. This solution is taught and claimed in copending U.S. patent application, Serial No. 315,030, filed October 9, 1963, entitled "Automatic Frequency Control System Having Phase Controlled Sampling ee of ETSH-utCMVB Means" by George E. Chadima and assigned to the assignee of the present invention. This invention, while similar to the Chadima invention, affords a new approach to the problem.

It is therefore an object of this invention to provide an automatic frequency control system of the sampling type that includes means whereby erroneous oscillator frequency shifts due to continuous tones in received modulating signals that are odd-harmonically related to the switching frequency are precluded.

More particularly, it is an object of this invention to provide an automatic frequency control system of the sampling type that includes dual error developing channels, the outputs from which are combined in a manner such that AFC system error that could occur due to continuous tones in received modulating signals that are odd-harmonically related to the switching frequency is precluded.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
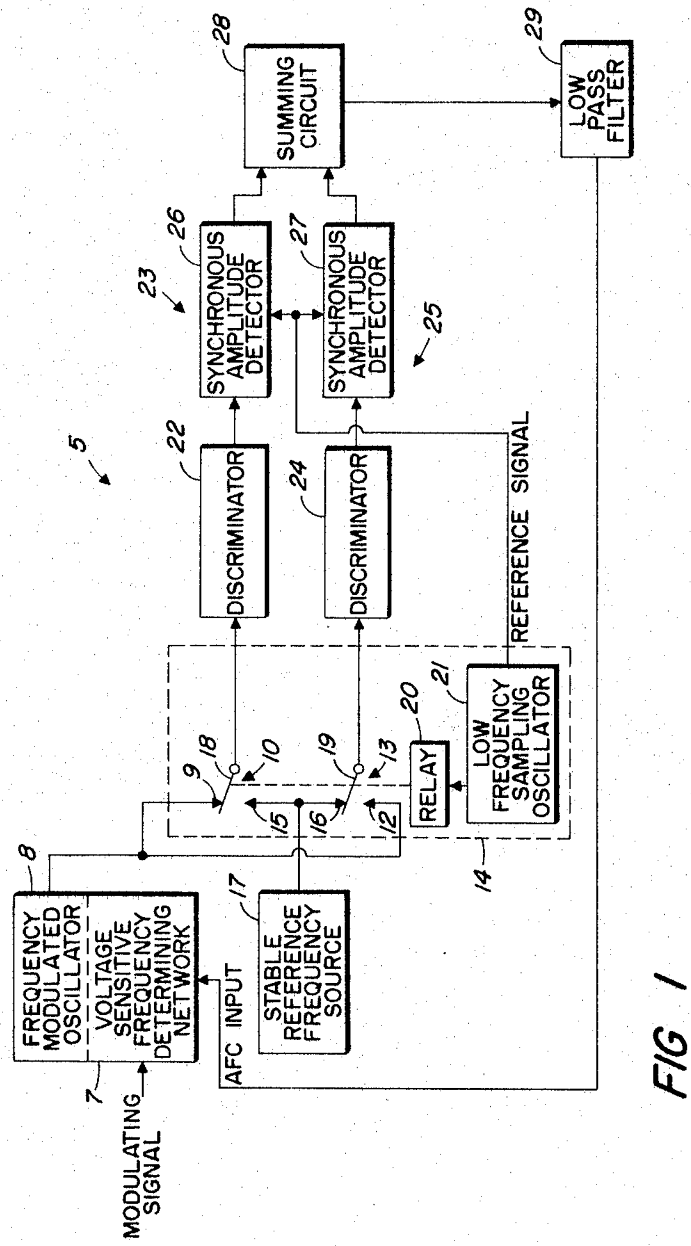
FIGURE 1 is a block diagram presentation of the automatic frequency control system of this invention.

Referring now to the drawings, the numeral 5 indicates generally the automatic frequency control system of this invention. As shown in FIGURE 1, modulating input signals are coupled to voltage sensitive frequency determining network 7 of frequency modulated oscillator 8. As is well known in the art, received modulation signals will cause the carrier frequency (determined by voltage sensitive frequency determining network 7) to be varied according to the frequency of the applied signal so that a frequency modulated output signal is coupled from oscillator 8.

The frequency modulated output signal from oscillator 8 is coupled, for purposes of automatic frequency control, to fixed contact 9 of switch 10 and to fixed contact 12 of switch 13, both of switching means 14 (which could be electronic switches, if desired). Switches 10 and 13 also have fixed contacts 15 and 16, respectively, which contacts are connected in common to reference stable frequency oscillator 17.

The movable contactors 18 and 19 of switches 10 and 13, respectively, are switched simultaneously by means of relay 20 energized by low frequency sampling oscillator 21, which oscillator is preferably a square wave oscillator. It is to be noted that when movable contactor 18 of switch 10 is in contact with fixed contactor 9 (which contactor is connected to frequency modulated oscillator 8), movable contactor 19 of switch 13 is connected to fixed contactor 16 (which contactor is connected to reference stable frequency oscillator 17). This means, of course, that switches 10 and 13 never simultaneously pass an output from the same source, but instead one switch always passes the output signal from one source while the other passes the output from the other source.

Switch 10 is connected to discriminator 22 in one demodulating channel 23, while switch 13 is connected to a second discriminator 24 in a second demodulating channel 25. Discriminator 22 is connected to synchronous amplitude detector 26 (again in the first demodulating channel), while discriminator 24 is connected to synchronous detector 27 (in the second demodulating channel). It can therefore be seen that, at any particular instant, one demodulating channel is receiving the output from one source (either from frequency modulator oscillator 8 or reference frequency source 17) while the other demodulating channel is receiving the output from the other source.

For synchronous detection of the discriminator outputs in each channel, both synchronous detectors 26 and 27 receive the output signal from switching oscillator 21.

The detected outputs from synchronous detectors 26 and 27 are then coupled to a summing circuit 28, and the summed output coupled through low pass filter 29 to the voltage sensitive frequency determining network 7 of oscillator 8 to correct any frequency deviation of the oscillator with respect to the reference frequency.

Figure 2:
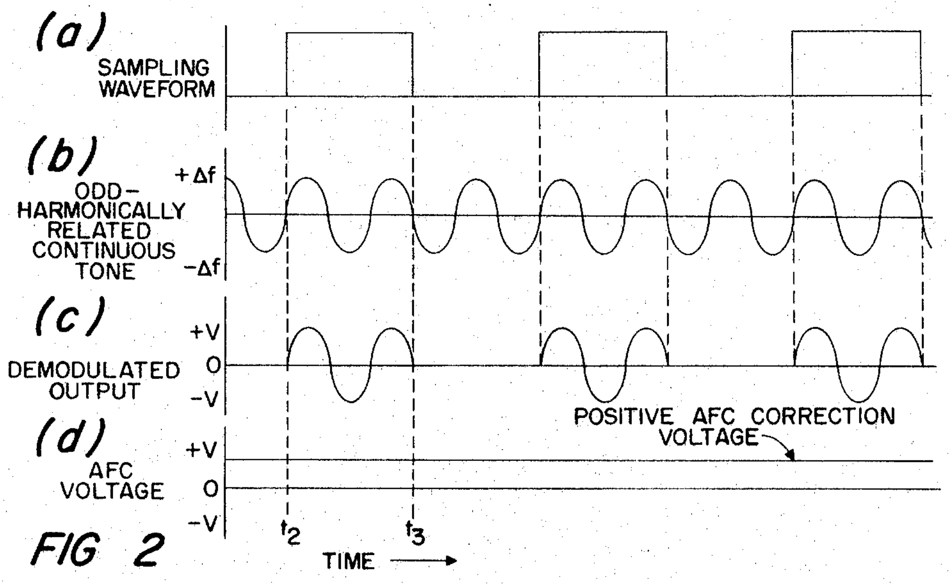
FIGURE 2 is a series of typical waveforms showing how error can occur in conventional automatic frequency control systems.

A conventional AFC system can introduce error into the system if received modulating signals include continuous tones that are odd-harmonically related to the sampling, or switching, oscillator frequency if these continuous tones occur other than shifted 90° with respect to the corresponding odd-harmonics of the sampling frequency. This is shown in FIGURE 2, where (*a*) and (*b*) illustrate typical in-phase sampling and odd-harmonically related tone waveforms (third harmonic shown by way of example), respectively. When this situation occurs, FIGURE 2(*c*) readily shows that there are unequal positive and negative portions appearing at the output of each demodulation channel during each alternation (time $t_2$ to $t_3$, for example) of the switching frequency, and this, of course, when filtered, will give an erroneous AFC correction voltage (as shown in FIGURE 2(*d*)), which voltage is coupled back to the voltage sensitive frequency determining network of the frequency modulated oscillator (this network may include a Varicap, for example).

Figure 3:
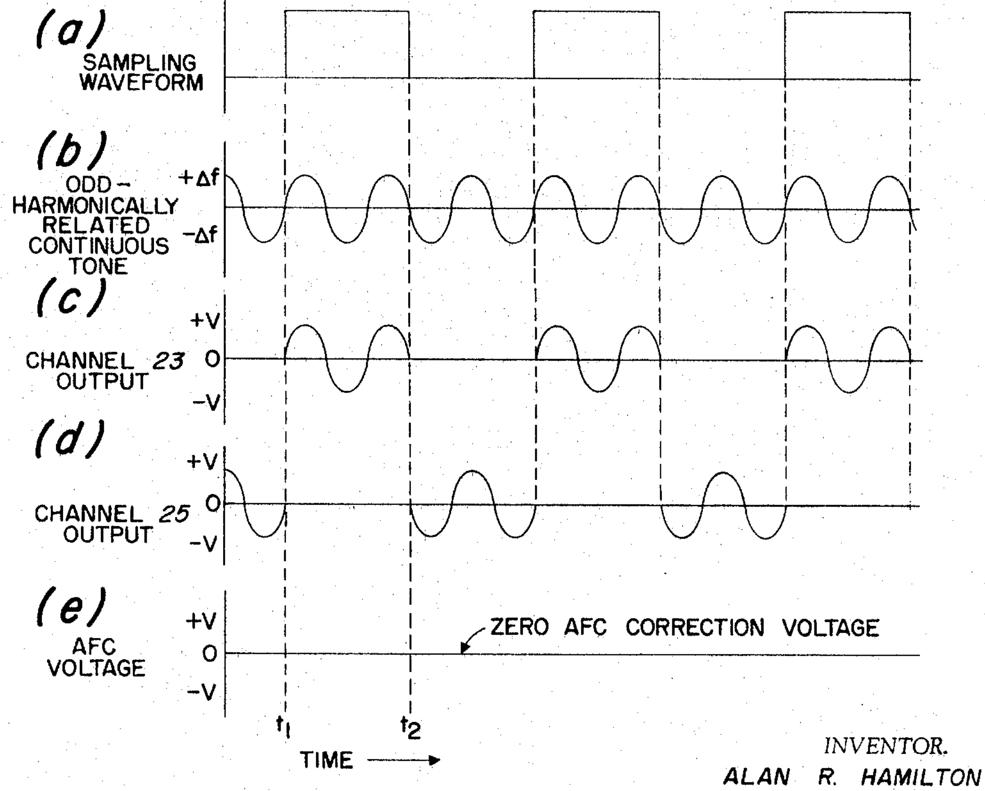
FIGURE 3 is a series of typical waveforms illustrating how error is precluded in the automatic frequency control system of this invention.

The erroneous AFC correction voltage, due to continuous tones odd-harmonically related to the sampling frequency, is precluded, however, when the system of this invention is utilized. As shown in FIGURE 3, and again using the same typical waveforms (as shown in FIGURES 3(*a*) and 3(*b*)) for the switching and continuous tone signals as mentioned with respect to conventional systems, it can be readily seen from FIGURES 3(*c*) and 3(*d*) that the output of demodulation channel 23 is exactly the same signal but opposite in phase to that of demodulation channel 25. This means that when added in summing circuit 28, the result is a zero AFC correction voltage. Thus, by this method, continuous tones in received modulating signals odd-harmonically related to the sampling frequency are automatically precluded from introducing error into the system.

For a true offset, of course, both channels must produce the same D.C. correction voltage. Although the two discriminators do not necessarily require that the center frequencies be identical, accuracy is dependent upon the linearity of the discriminator slopes. If one of the two discriminators should be linear but have a different slope, a gain control circuit in one channel or the other will provide compensation so that a continuous tone odd-harmonically related to the switching frequency will introduce no error into the system.

In view of the foregoing, it should be obvious to those skilled in the art that the sampling type automatic frequency control system of this invention provides a novel means for automatically precluding system error due to continuous tones in received modulating signals that are odd-harmonically related to the sampling frequency.

What is claimed as my invention is:

1. A system for automatically controlling the carrier frequency of a high frequency oscillator, which carrier frequency is modulated by received modulating signals, and which oscillator includes a voltage sensitive frequency determining network establishing said carrier frequency, said system comprising: a reference source providing an output signal having a reference frequency equal to the desired carrier frequency to be maintained; a first demodulating channel; first switching means for alternately coupling said frequency modulated signal and said reference frequency to said first demodulating channel; a second demodulating channel; switching means for alternately coupling said frequency modulated signal and said reference frequency to said second demodulating channel, said second demodulating channel receiving said reference frequency when said first demodulating channel is receiving said modulated signal and said second demodulating channel receiving said modulated signal when said first demodulating channel is receiving said reference frequency; a switching oscillator for controlling said switching means for simultaneous operation at a predetermined switching frequency; means for receiving the outputs from said first and second demodulating channels and developing an AFC correction signal if said carrier frequency is not identical to said reference frequency, said AFC correction signal being free of any error due to continuous tones in said received modulating signals that are odd-harmonically related to said switching frequency; and means for coupling said AFC correction signal to the voltage sensitive frequency determining network of said high frequency oscillator to adjust the output frequency of said high frequency oscillator to that of said reference frequency.

2. A system of claim 1 wherein said high frequency oscillator is a direct frequency modulated oscillator providing a frequency modulated output signal, and wherein each of said first and second demodulation channels includes a discriminator and a synchronous detector.

3. The system of claim 1 wherein said means for receiving the output from said first and second demodulation channels includes summing means for receiving the output signals from said channels.

4. A system for automatically controlling the carrier frequency of a high frequency oscillator providing a frequency modulated output signal, said high frequency oscillator having a voltage sensitive frequency determining network establishing said carrier frequency and being frequency modulated by received modulating signals, said system comprising: a reference source providing an output signal having a reference frequency equal to the desired carrier frequency to be maintained; first and second discriminators; first and second switching means; a switching square wave oscillator connected to said switching means and causing said switching means to operate simultaneously at a low switching frequency so that when said first discriminator receives said direct frequency modulated output signal said second frequency discriminator receives said reference frequency, and so that when said first discriminator receives said reference frequency said second discriminator receives said frequency modulated output signal; a first synchronous detector connected to receive the output from said first discriminator and the square wave output from said switching oscillator; a second synchronous detector connected to receive the output from said second discriminator and the square wave output from said switching oscillator; a summing circuit for receiving the outputs from both said synchronous detectors whereby errors due to a continuous tone in received modulating signals that are odd-harmonically related to said switching frequency are eliminated; and means for coupling the output from said summing circuit to said voltage sensitive frequency determining network of said high frequency oscillator to automatically correct any frequency deviation of said carrier frequency from said reference frequency.

No references cited.

KATHLEEN H. CLAFFY, *Primary Examiner.*

R. LINN, *Assistant Examiner.*